US012004033B2

(12) United States Patent
You

(10) Patent No.: US 12,004,033 B2
(45) Date of Patent: Jun. 4, 2024

(54) METHOD FOR SWITCHING BETWEEN ACCESS NETWORK DEVICES, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 17/525,508

(22) Filed: Nov. 12, 2021

(65) Prior Publication Data

US 2022/0070747 A1 Mar. 3, 2022

Related U.S. Application Data

(63) Continuation of application No. PCT/CN2019/086915, filed on May 14, 2019.

(51) Int. Cl.
*H04W 36/00* (2009.01)
*H04L 1/08* (2006.01)
(Continued)

(52) U.S. Cl.
CPC ......... *H04W 36/00837* (2018.08); *H04L 1/08* (2013.01); *H04W 36/0058* (2018.08); *H04W 36/30* (2013.01); *H04W 76/30* (2018.02)

(58) Field of Classification Search
CPC ....... H04W 36/00837; H04W 36/0058; H04W 36/30; H04W 76/30; H04W 74/0833;
(Continued)

(56) References Cited

U.S. PATENT DOCUMENTS

2009/0268637 A1\* 10/2009 Chen .................. H04W 36/023
370/254
2011/0021154 A1\* 1/2011 Marinier ................ H04L 5/001
455/67.11

(Continued)

FOREIGN PATENT DOCUMENTS

CN 101227677 A 7/2008
CN 101426252 A 5/2009

(Continued)

OTHER PUBLICATIONS

ZTE Corporation "Email discussion on solution 2 family", 3GPP TSG-RAN WG2 Meeting #94 Nanjing, China, Apr. 11-15, 2016 (R2-163863) (Year: 2016).\*

(Continued)

*Primary Examiner* — Ian N Moore
*Assistant Examiner* — Sun Jong Kim
(74) *Attorney, Agent, or Firm* — BAYES PLLC

(57) ABSTRACT

Disclosed are a method for switching between access network devices, a terminal device, and a network device. The method includes the terminal device initiating a random access to a target access network device while maintaining a connection with a source access network device. The method also includes the terminal device releasing the connection with the source access network device, after successfully accessing to the target access network device and in response to channel quality of the source access network device meeting a preset condition.

15 Claims, 6 Drawing Sheets

(51) Int. Cl.
*H04W 36/30* (2009.01)
*H04W 76/30* (2018.01)

(58) Field of Classification Search
CPC ............ H04W 36/0077; H04W 40/36; H04W 36/0033; H04W 36/0055; H04W 36/0044; H04W 36/0085; H04W 36/18; H04W 36/305; H04L 1/08

See application file for complete search history.

(56) References Cited

U.S. PATENT DOCUMENTS

| | | | | |
|---|---|---|---|---|
| 2019/0253945 | A1* | 8/2019 | Paladugu | H04W 76/27 |
| 2020/0145888 | A1* | 5/2020 | Paladugu | H04W 36/0069 |
| 2022/0167233 | A1* | 5/2022 | Shi | H04W 76/30 |

FOREIGN PATENT DOCUMENTS

| | | |
|---|---|---|
| CN | 101577950 A | 11/2009 |
| CN | 105659662 A | 6/2016 |
| CN | 106993313 A | 7/2017 |
| CN | 107371208 A | 11/2017 |
| CN | 107690162 A | 2/2018 |
| CN | 108632934 A | 10/2018 |
| KR | 20170114258 A | 10/2017 |
| WO | 2016049806 A1 | 4/2016 |
| WO | 2017194021 A1 | 11/2017 |

OTHER PUBLICATIONS

U.S. Appl. No. 62/754,512, filed Nov. 1, 2018 (Year: 2018).*

First Office Action issued in corresponding Indian Application No. 202127057964, mailed Jun. 7, 2022, 6 pages.

"Email discussion on solution 2 family", Source: ZTE Corporation, 3GPP TSG-RAN WG2 Meeting #94, R2-163863, Nanjing, China, Apr. 11-15, 2016, 35 pages.

Partial Supplementary European Search Report issued in corresponding European Application No. 19928446.4, mailed Mar. 18, 2022, 15 pages.

Request For CNIPA Patent Priority Review issued in corresponding Chinese application No. 202111478727.7, mailed Sep. 23, 2022.

International Search Report issued in corresponding International Application No. PCT/CN2019/086915, mailed Feb. 1, 2020, 31 pages.

PCT Written Opinion of the International Searching Authority issued in corresponding International Application No. PCT/CN2019/086915, mailed Feb. 1, 2020, 9 pages.

Second Office Action issued in corresponding European application No. 19928446.4, mailed Jul. 27, 2023.

First Office Action issued in corresponding Chinese application No. 202111478727.7, mailed Jan. 11, 2023.

First Office Action issued in corresponding European application No. 19928446.4, mailed Mar. 9, 2023.

Extended European Search Report issued in corresponding European Application No. 19928446.4, mailed Jun. 22, 2022.

Qualcomm Incorporated, "LTE mobility enhancements for eMBB HO using dual active protocol stack", R2-1906378 Revision of R2-1904646, 3GPP TSG-RAN WG2 Meeting #106 Reno, USA, May 13-17, 2019.

Third Office Action issued in corresponding European application No. 19928446.4, mailed Jan. 22, 2024.

* cited by examiner

METHOD FOR SWITCHING BETWEEN ACCESS NETWORK DEVICES, TERMINAL DEVICE, AND NETWORK DEVICE

CROSS-REFERENCE TO RELATED APPLICATION

This application is a continuation of International Application No. PCT/CN2019/086915, filed on May 14, 2019, the entire contents of which are hereby incorporated by reference.

BACKGROUND

Embodiments of the present disclosure relate to the field of communications, and in particular to a method for switching between access network devices, a terminal device, and a network device.

A handover process in an existing Long Term Evolution (LTE) system works as follows. A source access network device sends a handover request to a target access network device according to a measurement report reported by a terminal device, and sends a handover command to the terminal device after receiving a response from the target access network device with respect to the handover request. Then, the terminal device may perform reconfiguration according to the handover command, and release and disconnect a connection with the source access network device. At this time, the terminal device has not fully accessed to the target access network device, which leads to interruption of data interaction.

SUMMARY

Embodiments of the present disclosure provide a method for switching between access network devices, a terminal device, and a network device, which reduces the duration in which data reception and transmission is interrupted while improving robustness of handover.

In a first aspect, there is provided a method for switching between access network devices. The method includes initiating, by a terminal device, a random access to a target access network device while maintaining a connection with a source access network device; and after having been successfully accessed to the target access network device and when channel quality of the source access network device meets a preset condition, releasing, by the terminal device, the connection with the source access network device.

In a second aspect, there is provided a method for switching between access network devices. The method includes after a target access network device has been successfully accessed to by a terminal device while maintaining a connection with a source access network device, receiving, by a network device, auxiliary information, wherein the network device is the source access network device or the target access network device; and sending, by the network device, response information of the auxiliary information, wherein the response information is configured to instruct the terminal device to release the connection with the source access network device.

In a third aspect, there is provided a terminal device, configured to execute the method according to the first aspect or the implementations thereof.

Specifically, the terminal device includes a functional module configured to execute the method in the first aspect or the implementations thereof.

In a fourth aspect, there is provided a network device, configured to execute the method according to the second aspect or the implementations thereof.

Specifically, the network device includes a functional module configured to execute the method in the second aspect or any of the implementations thereof.

In a fifth aspect, there is provided a terminal device including a processor and a memory. The memory is configured to store a computer program, and the processor is configured to call and run the computer program stored in the memory to execute the method in the first aspect or the implementations thereof.

In a sixth aspect, there is provided a network device including a processor and a memory. The memory is configured to store a computer program, and the processor is configured to call and run the computer program stored in the memory to execute the method in the second aspect or any of the implementations thereof.

In a seventh aspect, there is provided a chip configured to execute the method in any one of the first to second aspects or any of the implementations thereof.

Specifically, the chip includes a processor, configured to call and run a computer program from a memory, so that a device installed with the chip executes the method in any one of the first to second aspects or any of the implementations thereof.

In an eighth aspect, there is provided a computer-readable storage medium, configured to store a computer program that causes a computer to execute the method in any one of the first to second aspects or any of the implementations thereof.

In a ninth aspect, there is provided a computer program product, including computer program instructions, which cause the computer to execute the method in any one of the first to second aspects or any of the implementations thereof.

In a tenth aspect, there is provided a computer program which, when run on a computer, causes the computer to execute the method in any one of the first to second aspects or any of the implementations thereof.

Through the above technical solutions, after successfully accessing to the target access network device, the terminal device may release the connection with the source access network device based on the channel quality of the source access network device, which facilitate reducing the duration in which the data reception and transmission is interrupted while improving robustness of handover.

These and other aspects of the present disclosure will be more concise and understandable from the following description of embodiments.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

It should be understood that the technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a New Radio (NR) or a future 5G system, etc.

In particular, the technical solutions of embodiments of the present disclosure may be applied to various communication systems based on non-orthogonal multiple access technology, such as Sparse Code Multiple Access (SCMA) system, and Low Density Signature (LDS) system. Of course, the SCMA system and the LDS system may also be called as other names in the field of communication. Further, the technical solution of embodiments of the present disclosure may be applied to multi-carrier transmission systems based on non-orthogonal multiple access technology, for example, Orthogonal Frequency Division Multiplexing (OFDM), Filter Bank Multi-Carrier (FBMC), Generalized Frequency Division Multiplexing (GFDM), and Filtered-OFDM (F-OFDM) system.

Figure 1:
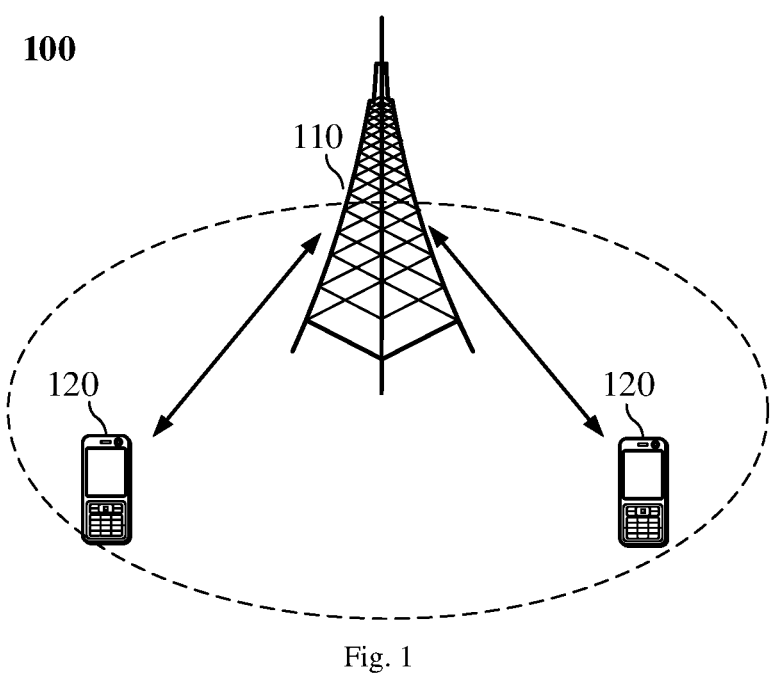
FIG. 1 is a schematic diagram of a communication system architecture provided by an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to an embodiment, the network device 110 may be a Base Transceiver Station (BTS) in a GSM system or a CDMA system, a base station NodeB (NB) in a WCDMA system, an evolved base station (Evolutional Node B, eNB or eNodeB) in an LTE system, or a wireless controller in a Cloud Radio Access Network (CRAN). Alternatively, the network device may be a mobile switching center, a relay station, an access point, an on-vehicle device, a wearable device, a hub, a switch, a network bridge, a router, a network device gNB in a 5G network, or a network device in a future evolved Public Land Mobile Network (PLMN), etc.

The communication system 100 also includes at least one terminal device 120 within the coverage area of the network device 110. The "terminal device" as used herein includes but not limited to User Equipment (UE), access terminal, user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved Public Land Mobile Network (PLMN), etc., which is not limited by the embodiments of the present disclosure.

According to embodiments, Device to Device (D2D) communication may be performed between the terminal devices 120.

According to embodiments, the 5G system or the 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices. Embodiments of the present disclosure do not impose specific limitations in this regard.

According to embodiments, the communication system 100 may also include other network entities such as a network controller and a mobility management entity, and embodiments of the present disclosure do not impose specific limitations in this regard.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions. The network device 110 and the terminal devices 120 may be the devices described above, which will not be repeated here. The communication devices may also include other devices in the communication system 100, such as other network entities such as a mobile management entity (MME), a serving gateway (S-GW), a packet data network gateway (P-GW), etc., which is not limited by embodiments of the present disclosure.

It should be understood that the terms "system" and "network" are often used interchangeably herein. The term "and/or" herein is only an association relationship that describes associated objects, and represents that there may be three relationships. For example, A and/or B may represent that A exists alone, A and B exist simultaneously, and B exists alone. In addition, the character "/" herein generally indicates that front and back associated objects are in an "or" relationship.

Figure 2:
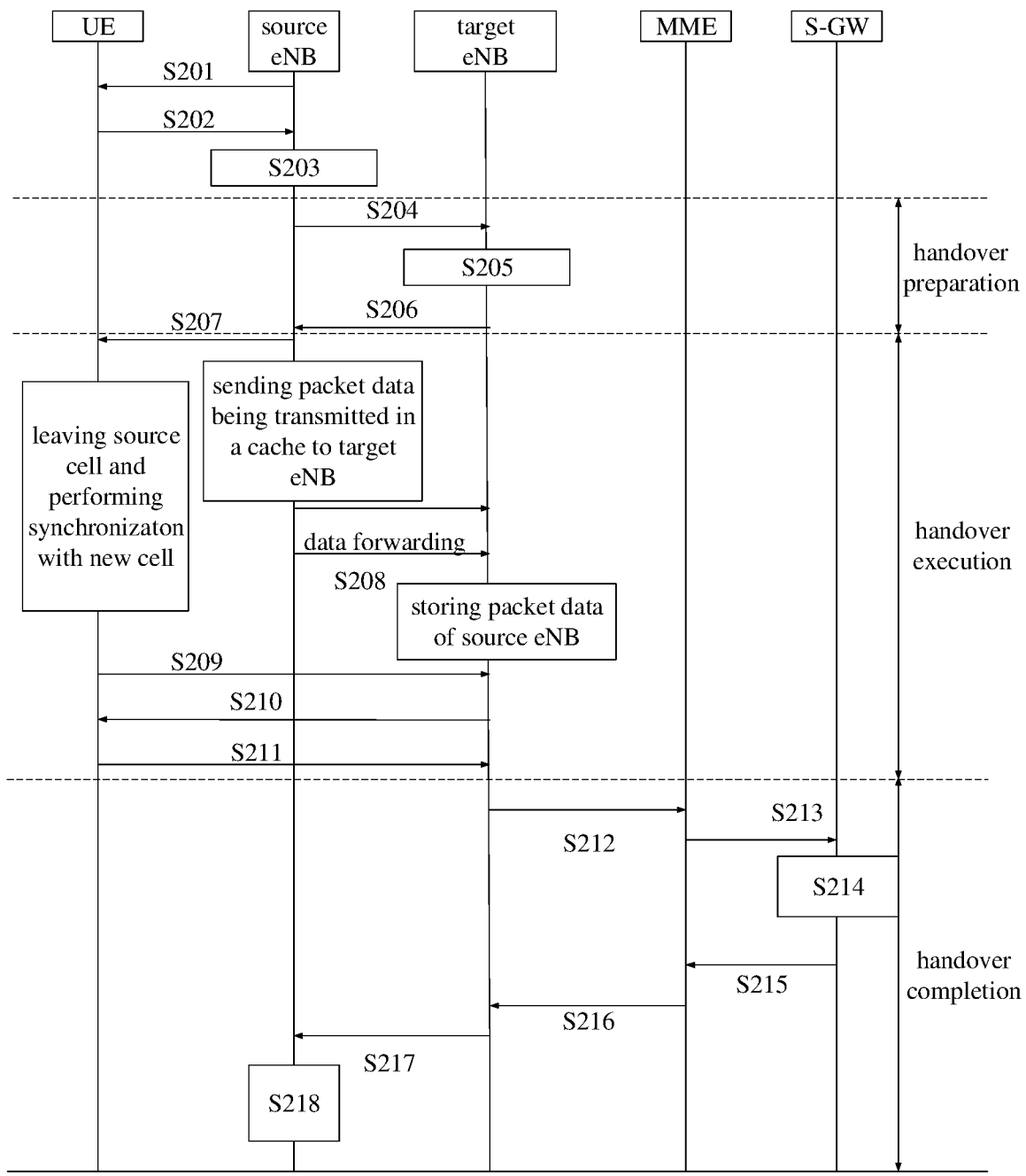
FIG. 2 is a schematic diagram of a handover process provided by an embodiment of the present disclosure.

To facilitate understanding, a handover process in the existing LTE system will be described in detail below in conjunction with FIG. 2. As shown in FIG. 2, the handover process mainly includes three processes of handover preparation, handover execution, and handover completion, which specifically includes a portion or all of the following steps In S201, a source eNB transmits a measurement configuration to UE, a measurement result of the LTE being used to assist the source eNB in performing handover decision.

In S202, the UE reports a measurement report according to the measurement configuration.

In S203, the source eNB performs handover decision according to its own handover algorithm with reference to the measurement result reported by the UE.

In S204, the source eNB sends a handover request message to a target eNB, the message including information about a preparation for handover, mainly including a UE X2/S1 signaling context reference, an identifier of a target cell, a security key, a Radio Resource Control (RRC) context, an Access Stratum (AS) configuration, an Evolved-Universal Terrestrial Radio Access (E-UTRAN) Radio Access Bearer (E-RAB) context, and the like. The message also includes a Physical (PRY) identifier of a source cell and a message authentication and verification code, for a possible recovery process after a handover failure. The UE X2/S1 signaling context reference may help the target eNB to find a position of the source eNB. The E-RAB context includes required Radio Network Layer (RLN) and Transport Network Layer (TNL) addressing information, E-RAB Quality of Service (QOS) information, and the like.

In S205, the target eNB performs admission control according to the received E-RAB QoS information, so as to increase a success rate of handover. For admission control, reservation of a corresponding resource, a Cell Radio Network Temporary Identifier (C-RNTI), allocation of a dedicated random access preamble, and the like are required to be considered. The AS configuration for a target cell may be a complete configuration completely independent of a source cell, and may also be an incremental configuration based on the source cell, wherein the incremental configuration means that the same part is not configured, only a different part is reconfigured through signaling, and the UE will continue to use the original configuration for the configuration that has not been received).

In S206, the target eNB performs Layer 1 (L1)/Layer 2 (L2) handover preparations and simultaneously sends a handover request Acknowledgement (ACK) message to the source eNB. The message includes an RRC container, and the specific content is a handover command that triggers the UE to perform handover. The source eNB sends the handover command to the UE in a transparent transmission manner (without any modification). The handover command includes a new C-RNTI and a case algorithm identifier of the target eNB, and may also contain the dedicated random access preamble, an access parameter, system information and the like. If necessary, the handover request ACK message may further contain RNL/TNL information for data forwarding. After the source eNB receives the handover request ACK message or forwards the handover command to the UE, the data forwarding may be started.

In S207, the handover command (an RRC connection reconfiguration message containing mobility control information) is generated by the target eNB and transparently transmitted to the UE through the source eNB. The source eNB performs required encryption and integrity protection on the message. The UE, after receiving the message, may initiate a handover process by use of a relevant parameter in the message. The UE may initiate the handover process without waiting for a Hybrid Automatic Repeat reQuest (HARQ)/Automatic Repeat reQuest (ARQ) response sent to the source eNB by a lower layer.

In S208, the source eNB sends a Sequence Number (SN) status transmission message to the target eNB, so as to transmit an uplink Packet Data Convergence Protocol (PDCP) SN receiving status and a downlink PDCP SN sending status of an E-RAB. The uplink PDCP SN receiving status at least includes a PDCP SN of a last uplink SDU received in sequence, and may also include SNs of lost uplink SDUs that cause out-of-order reception and are represented in a bit mapping form (if such SDUs exist, these SDUs may be required to be retransmitted by the UE in the target cell). The downlink PDCP SN sending status indicates a serial number of a next SDU that should be allocated by the target eNB. If there is no E-RAE that needs to send a PDCP status report, the source eNB may omit the message.

In S209, the UE, after receiving the handover command, executes synchronization with the target cell. If the dedicated random access preamble is configured in the handover command, a non-contention random access procedure is used to access the target cell. If no dedicated preamble is configured, a contention-based random access procedure is used to access the target cell. The UE calculates a key required to be used by the target eNB, and configures a security algorithm selected by a network to be used by the target eNB, so as to communicate with the target eNB after successful handover.

In S210, the network returns an uplink resource allocation indication and a timing advance.

In S211, after the UE successfully accesses the target cell, the UE sends an RRC connection reconfiguration complete message, to confirm to the target eNB that the handover process has been completed. If there are enough resources, the message may also be accompanied with an improvement of an uplink Buffer Status Report (BSR). The target eNB receives the RRC connection reconfiguration complete message to confirm successful handover. The target eNB may then start sending data to the UE.

In S212, the target eNB sends a path handover request message to an MME, to notify that the UE has been switched to another cell. In such case, radio handover has been successfully completed.

In S213, the MME sends a user-plane update request message to an S-GW.

In S214, the S-GW switches a downlink data path to a target eNB side. The S-GW sends one or more "end marker packet" to the source eNB on the old path, and then a user-plane resource of the source eNB may be released.

In S215, the S-GW sends a user-plane update response message to the MME.

In S216, the MME sends a path handover request ACK message to the target eNB. A path handover process is completed by steps 12 to 16, and this process is executed to switch a user-plane data path from the source eNB to the target eNB. After the downlink path is switched by the S-GW, data packets of a forwarding path and a new path may alternately arrive at the target eNB. The target eNB should transmit all forward data packets to the UE at first, and then transmit the packets received from the new path. Adopting this method by the target eNB may forcibly ensure a correct transmission sequence. In order for assisting a re-sequencing function at the target eNB, after path handover of the E-RAB, the S-GW immediately sends one or more "end marker packet" on the old path. The "end marker packet" includes no user data, and is indicated by a General Data Transfer Platform (GTP) header. After sending of the packet with a marker is completed, the S-GW should not send any data packet on the old path. After receiving the "end marker packet", if forwarding is active for this hearer, the source eNB should send the packet to the target eNB. After detecting the "end marker packet", the target eNB should discard the "end marker packet" and initiate any required process to maintain sequential submission of a user, wherein the data is forwarded through an X2 interface or received from the S-GW through an S1 interface after path handover.

In S217, the target eNB sends a UE context release message to the source eNB, to notify the source eNB of successful handover and trigger resource release of the source eNB. The target eNB, after receiving the path handover ACK message returned by the MME, sends such message.

In S218, the source eNB, after receiving the UE context release message, may release the radio bearer and the control-plane resource related to the UE context. Any ongoing data forwarding is continued.

However, for some special scenarios, such as UE high-speed movement or high-frequency conditions, the UE needs to frequently perform handover (HO). Therefore, a new handover process, namely conditional handover, is proposed. The conditional handover avoids the problem that the handover preparation time is too long and the UE is too late to handover. An handover (HO) command may be configured for the UE in advance. On the other hand, for a high-speed rail scenario, the UE's moving trajectory is fixed. Thus, the source base station may allocate the target base station to the UE in advance, and the HO command includes a condition for triggering the UE to perform handover. When the configured condition is met, the UE initiates an access request to the target base station.

Figure 3:
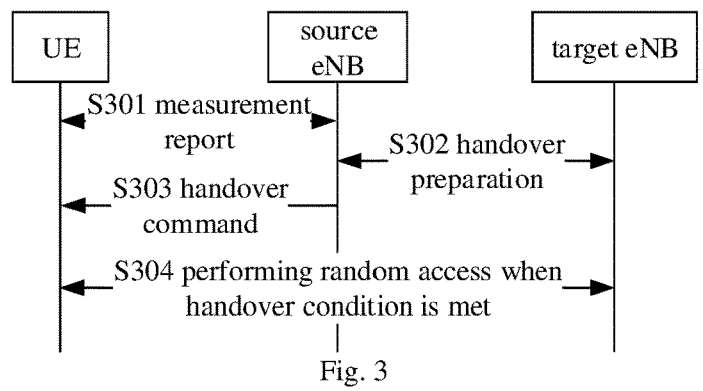
FIG. 3 is a schematic diagram of a conditional handover process provided by an embodiment of the present disclosure.

Specifically, the 3GPP RAN2 #104 meeting has agreed to this conditional handover, which supports configuration of multiple target cells in the HO command during the conditional handover process. For example, FIG. 3 shows a schematic diagram of part of the conditional handover process. In order to distinguish from the handover shown in FIG. 2 above, the handover process corresponding to FIG. 2 is referred to as normal handover (normal HO) in the present disclosure.

As shown in FIG. 3, S301 is a measurement report, and the UE reports the measurement report to the source eNB, which is similar to the normal handover process. The S301 may correspond to S201 and S202 in the normal handover process shown in FIG. 2 above. For brevity, details are not repeated here.

S302 is handover preparation, and the handover preparation is performed between the source eNB and the target eNB, which is similar to the normal handover process. Specifically, the source eNB may perform handover preparation with one or more target eNBs. For example, the source eNB may send a handover request to one or more target eNBs. The handover preparation step performed between the source eNB and any target eNB in S302 may correspond to S203 and S204 in the normal handover process shown in FIG. 2. For brevity, details are not repeated here.

S303 is the handover command. Multiple target cells or multiple target eNBs may be configured in the handover command sent by the source eNB to the UE. Optionally, the condition for performing handover by the UE may also be configured. For example, the handover condition may include information such as cell status or beam status, to facilitate the UE to determine to access to which target cell or target eNB based on the configured condition.

S304 is performing random access when the handover condition is met. The UE determines whether the configured multiple target cells or the configured multiple target eNBs meet the handover condition according to the configured condition, and performs random access when a certain target cell or target eNB meets the condition.

At present, the UE will disconnect from the source eNB after receiving the handover command. During the time period from the UE initiating the random access to the target eNB to the UE successfully accessing to it, data interaction will be interrupted. Starting from the existing handover process, embodiments of the present disclosure propose that the terminal device continues to maintain the connection with the source access network device after receiving the handover command, and initiates the random access to the target access network device, until the terminal device successfully accesses to the target access network device thereby releasing the connection with the source access network device. This scheme may effectively achieve the effect of reducing interruption time during the handover process.

Figure 4:
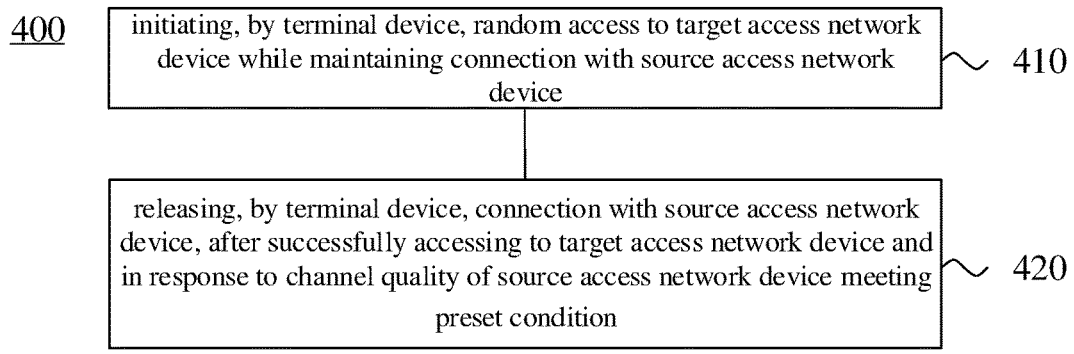
FIG. 4 is a schematic block diagram of a method for switching between access network devices provided by an embodiment of the present disclosure.

FIG. 4 shows a schematic block diagram of a method 400 for switching between access network devices according to an embodiment of the present disclosure. As shown in FIG. 4, the method 200 includes a portion or all of the following contents.

In S410, the terminal device initiates the random access to the target access network device while maintaining the connection with the source access network device.

In S420, in response to the channel quality of the source access network device meeting a preset condition, and after successfully accessing to the target access network device, the terminal device releases the connection with the source access network device.

Specifically, after receiving the handover command, the terminal device may continue to maintain the connection with the source access network device, and initiate the random access to the target access network device. After successfully accessing to the target access network device, the terminal device may release the connection with the source access network device. Further, when the terminal device successfully accesses to the target access network device and the channel quality of the source access network device meets the preset condition, the terminal device releases the connection with the source access network device. For example, when the channel quality of the source access network device is so poor that the preset condition is met, the terminal device releases the connection with the source access network device.

In an implementable embodiment, the terminal device may monitor the channel quality of the source access network device. When the terminal device determines that the channel quality of the source access network device meets the preset condition, the terminal device actively releases the connection with the source access network device. At this time, the source access network device may determine that the terminal device has released the connection with the source access network device based on the network implementation.

In another alternative embodiment, the terminal device may also send auxiliary information to the network device (the source access network device and/or the target access network device), and the auxiliary information is used for indicating the channel quality of the source access network device. Only when it is determined that the channel quality of the source access network device meets the preset condition, the network device sends response information to the terminal device, so that the terminal device releases the connection with the source access network device.

In other alternative embodiments, the terminal device may also monitor the channel quality of the source access network device. When the terminal device determines that the channel quality of the source access network device meets the preset condition, the terminal device sends the auxiliary information to the network device (the source access network device and/or target access network device), and the auxiliary information is used for indicating that the channel quality of the source access network device meets the preset conditions. Then, the network device may send the response information of the auxiliary information to the terminal device. After receiving the response information, the terminal device will release the connection with the source access network device.

It should be noted that the auxiliary information indicates that the channel quality of the source access network device meets the preset condition, which may be a direct indication or an indirect indication. For example, the auxiliary information is 1 bit, wherein "0" indicates that the channel quality of the source access network device does not meet the preset condition, and "1" indicates that the channel quality of the source access network device meets the preset condition. As another example, the auxiliary information may indirectly indicate that the channel condition of the source access network device meets the preset condition by indicating the channel quality of the source access network device. For example, the channel quality of the source access network device is carried in the auxiliary information. Alternatively, the channel quality is, for example, divided into 5 levels. A level lower than 3 of the channel quality indicates that the channel quality of the source access network device meets the preset conditions, and the level higher than or equal to 3 of the channel quality indicates that the channel quality of the source access network device does not meet the preset condition.

As can be seen from the foregoing various embodiments, the terminal device may determine that the channel quality of the source access network device meets the preset condition, or the network device may determine that the channel quality of the source access network device meets the preset condition. Specifically, a threshold value may be configured by the network device, which may be stored in the network device or in the terminal device. The terminal device may measure the channel quality of the source access network device and compare a measurement result with the stored threshold value. If it is lower than the threshold value, the terminal device may consider that the channel quality of the source access network device meets the preset condition. Alternatively, the terminal device may also send the measurement result obtained by measuring the channel quality of the source access network device to the network device, and the network device compares the measurement result with the stored threshold value. If it is lower than the threshold value, the network device may consider that the channel quality of the source access network device meets the preset condition. The terminal device may also determine that the channel quality of the source access network device meets the preset condition, by determining that a radio link failure (RLF) occurs on a link between the terminal device and the source access network device.

It should be understood that the measurement result obtained by measuring the channel quality of the source access network device may be at least one of reference signal received power (RSRP), reference signal received quality (RSRQ), and signal to interference plus noise ratio (SINR), etc., and the threshold value may be a threshold value corresponding to at least one of parameters of RSRP, RSRQ, and SINR, of which the unit may be dB or dBm.

It should also be understood that the occurrence of RLF on the link between the terminal device and the source access network device may include at least one of the following situations: retransmissions of a radio link control (RLC) automatic repeat-request (ARQ) reaching a maximum number of times, multiple out-of-synchronization indications being continuously received by the terminal device, and expiry of timer T310 or timer T312.

Optionally, if the terminal device or the network device determines that the channel quality of the source access network device is higher than or equal to a pre-configured threshold value, the terminal device may not release the connection with the source access network device, until it determines that the channel quality of the source access network device is lower than the pre-configured threshold value, thereby releasing the connection with the source access network device. Alternatively, when the terminal device or the network device determines that the channel quality of the source access network device is higher than or equal to the pre-configured threshold value, a timer is started. Only when the timer expires, the terminal device releases the connection with the source access network device.

Optionally, the measurement performed on the source access network device by the terminal device before initiating the random access to the target access network device, and the measurement performed on the source access network device by the terminal device after successfully accessing to the target access network device may be based on the above-mentioned same or different parameters, and the threshold values for determining the channel quality in these two measurements may be the same or different, which is not limited by embodiments of the present disclosure.

Optionally, in embodiments of the present disclosure, before initiating the random access to the target access network device, the terminal device receives the handover command sent by the source access network device, wherein the handover command indicates that the type of this handover is simultaneous connectivity handover (HO). That is, the handover command indicates that the terminal device is switched from the source access network device to the target access network device, while the terminal device maintains the connection with the source access network device. At the same time, the source access network device may also configure a measurement event of channel quality monitoring of the source access network device for the terminal device. For example, the measurement event may be carried in the handover command, and the measurement event may include threshold values corresponding to one or more target access network devices. It should be understood that the so-called type of handover may include the above-mentioned conditional handover, normal handover, and simultaneous connectivity handover, etc. For example, the normal handover may refer to a handover without any enhancement. For example, the normal handover may be the handover process shown in FIG. 2. The conditional handover may be a handover process as shown in FIG. 3. Embodiments of the present disclosure are mainly aimed at the scenario of simultaneous connectivity handover. In addition, the type of handover may also include other types. For example, it may also include random access channel-less (RACH-LESS) handover. It may also include make before break (MBB) handover. It may also include a handover in which the UE performs HO execution (S304) while maintaining the connection with the source base station during conditional handover.

Optionally, the terminal device initiating the random access to a target access network device configured in the handover command, while maintaining the connection with the source access network device, may include reserving a protocol stack of a source cell (corresponding to the source access network device in embodiments of the present disclosure), which includes reserving a user-plane data radio bearer (DRB) and/or a signaling radio bearer (SRB) of the source cell; establishing a protocol stack of the target cell (corresponding to the target access network device in embodiments of the present disclosure), including establishing the DRB and/or SRB of the target cell.

Optionally, for contention-free random access (CFRA), the terminal device successfully accessing to the target access network device may be that the terminal device successfully receives the RAR or sends a handover completion message (RRC reconfiguration complete message). For contention-based random access (CBRA), it may be that the terminal device successfully sends the handover completion message (RRC reconfiguration complete message) or successfully receives a contention resolution message.

The technical solution of the present disclosure will be described in detail below in conjunction with the following specific embodiments.

Figure 5:
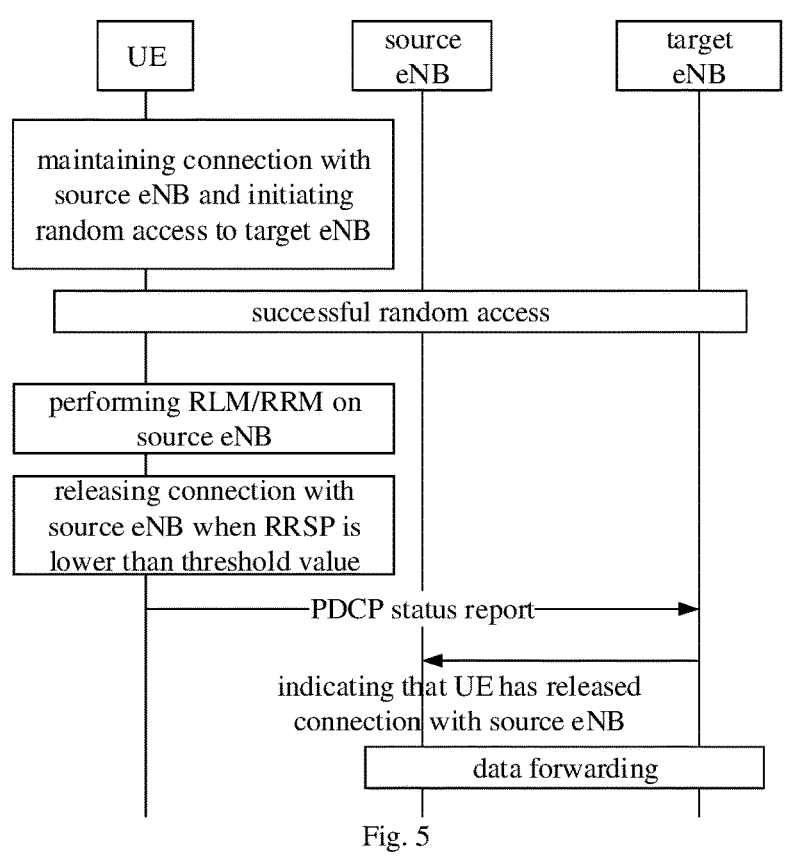
FIG. 5 is a schematic flowchart of a method for switching between access network devices provided by an embodiment of the present disclosure.

Optionally, as a first embodiment, as shown in FIG. 5, the terminal device may initiate the random access to the target access network device while maintaining the connection with the source access network device. After successfully accessing to the target access network device, the terminal device may measure the channel quality of the source access network device, for example, performing radio link monitor (RLM) or radio resource management (RRM). When the measured value (for example, RSRP) of the channel quality is lower than the pre-configured threshold, the terminal device may actively release the connection with the source access network device.

For the source access network device, according to an implementation, the source access network device can determine that the terminal device has released the connection with the source access network device based on the implementation. According to another implementation, the terminal device may also send a packet data convergence protocol (PDCP) status report to the target access network device, to inform the target access network device of current reception status of the downlink data. After the target access network device receives the PDCP status report, it may also notify the source access network device that the terminal device has released the connection with the source access network device. Then, the source access network device may sends data forwarding information to the target access network device, wherein the data forwarding may include downlink data packets that have not received correct feedback and/or data packets to be transmitted.

Figure 6:
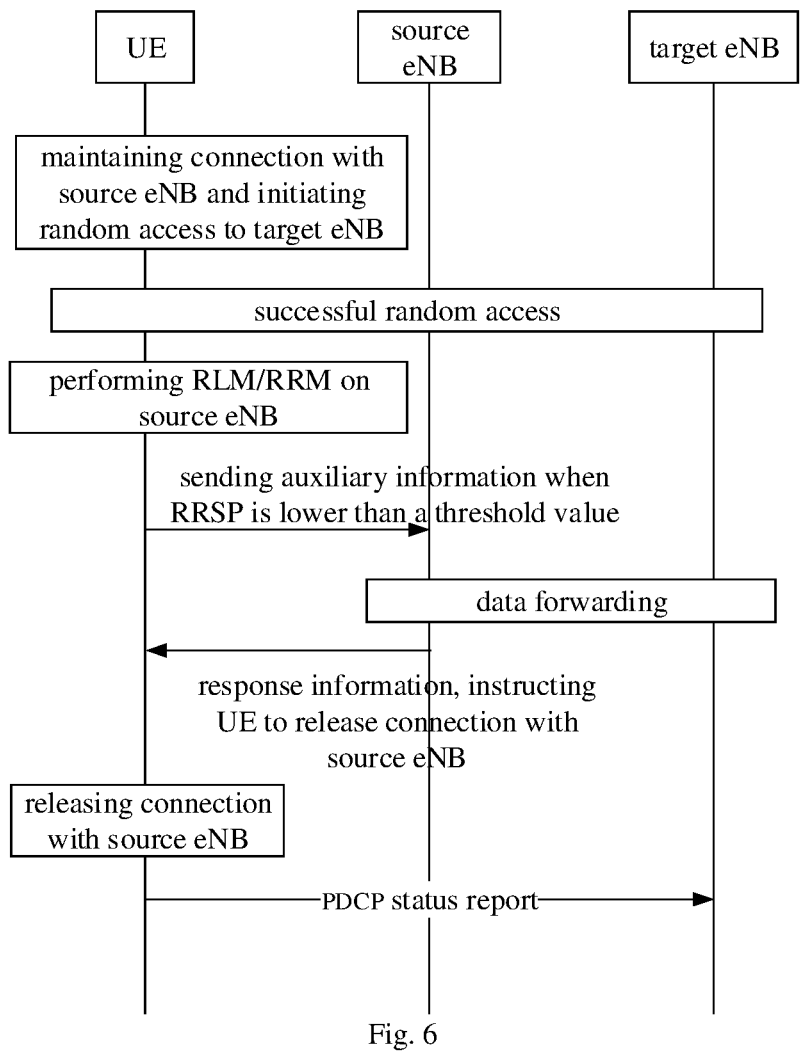
FIG. 6 is a schematic flowchart of a method for switching between access network devices provided by an embodiment of the present disclosure.

Optionally, as a second embodiment, as shown in FIG. 6, the terminal device may initiate the random access to the target access network device while maintaining the connection with the source access network device. After successfully accessing to the target access network device, the terminal device may measure the channel quality of the source access network device, for example, performing RLM or RRM. When the measured value (for example, RSRP) of the channel quality is lower than the pre-configured threshold value, the terminal device may send the auxiliary information to the source access network device, to indicate that the channel quality of the source access network device meets the preset condition. Then, after receiving the auxiliary information sent by the terminal device, the source access network device may stop scheduling the downlink data to the terminal device, and may also send the response information of the auxiliary information to the terminal device. Alternatively, the source access network device instructs the target access network device to send the response information of the auxiliary information to the terminal device, so that the terminal device releases the connection with the source access network device. After receiving the auxiliary information sent by the terminal device, the source access network device may also send the data forwarding to the target access network device, wherein the data forwarding may include downlink data packets that have not received correct feedback and/or data packets to be transmitted, etc. After receiving the response information sent by the source access network device or the target access network device, the terminal device can release the connection with the source access network device, and may also send the PDCP status report to the target access network device.

Figure 7:
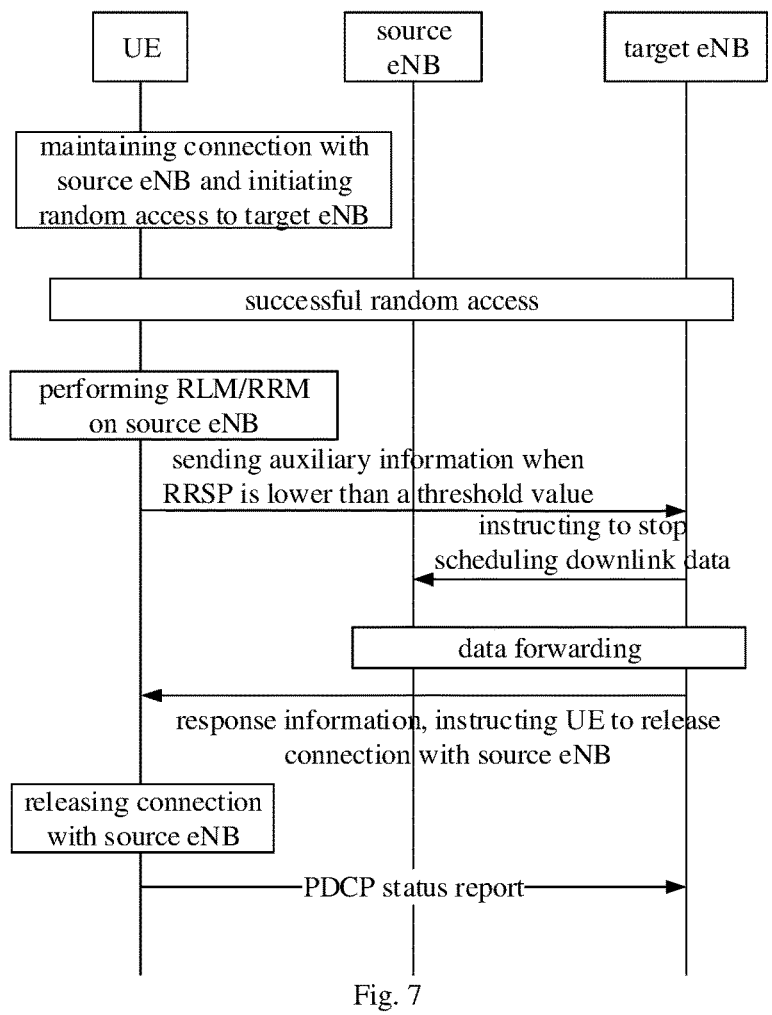
FIG. 7 is a schematic flowchart of a method for switching between access network devices provided by an embodiment of the present disclosure.

Optionally, as a third embodiment, as shown in FIG. 7, the terminal device may initiate the random access to the target access network device while maintaining the connection with the source access network device. After successfully accessing to the target access network device, the terminal device may measure the channel quality of the source access network device, for example, performing RLM or RRM. When the measured value (for example, RSRP) of the channel quality is lower than the pre-configured threshold value, the terminal device may send the auxiliary information to the target access network device, and the target access network device instructs the source access network device to stop scheduling the downlink data. The target access network device may also send the response information of the auxiliary information to the terminal device, or instruct the source access network device to send the response information of the auxiliary information to the terminal device, so that the terminal device releases the connection with the source access network device. The target access network device may also instruct the source access network device to send the data forwarding to the target access network device, wherein the data forwarding may include downlink data packets that have not received correct feedback and data packets to be transmitted, etc. After receiving the response information sent by the target access network device or the source access network device, the terminal device can release the connection with the source access network device, and may also send the PDCP status report to the target access network device.

Optionally, as a fourth embodiment, the terminal device may initiate the random access to the target access network device while maintaining the connection with the source access network device. After successfully accessing to the target access network device, the terminal device may measure the channel quality of the source access network device, for example, performing RLM or RRM. When the measured value (for example, RSRP) of the channel quality is lower than the pre-configured threshold value, the terminal device may send the auxiliary information to both the target access network device and the source access network device. If only one of the target access network device and the source access network device receives the auxiliary information sent by the terminal device, execution is done according to the second embodiment and the third embodiment. If both the target access network device and the source access network device receive the auxiliary information sent by the terminal device, they can interact with each other, so that one of them sends the response information of the auxiliary information to the terminal device. For the remaining steps, please refer to the second embodiment and the third embodiment.

Optionally, the auxiliary information in embodiments of the present disclosure may be carried in a radio resource control (RRC) signaling, a media access control (MAC) control element (CE) signaling, or uplink control information (UCI).

Optionally, in embodiments of the present disclosure, the terminal device receiving the response information of the auxiliary information and releasing the connection with the source access network device may be executed after the source access network device sends the data forwarding to the target access network device.

Therefore, in the method for switching between access network devices in embodiments of the present disclosure, the connection with the source access network device is released based on the channel quality of the source cell after the target access network device is successfully accessed to, so that the terminal device and the source access network device are kept in synchronization when the connection is released. Further, the source access network device may send the data forwarding to the target access network device in advance based on the auxiliary information, thereby reducing the interruption time of data transmission and reception and increasing the robustness of handover.

Figure 8:
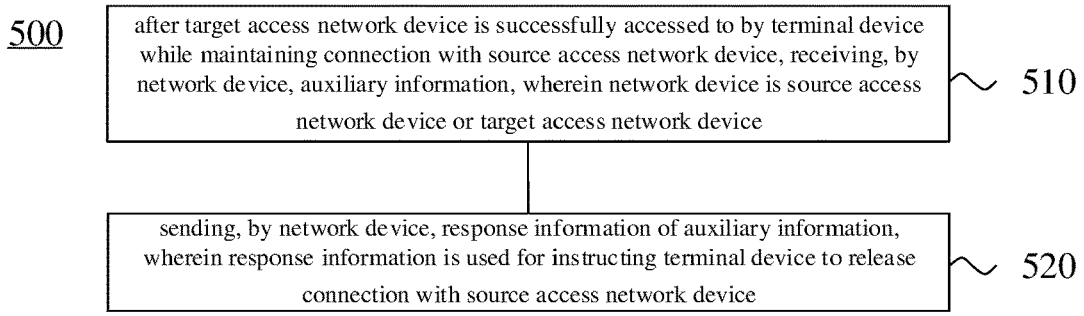
FIG. 8 is a schematic block diagram of a method for switching between access network devices provided by an embodiment of the present disclosure.

FIG. 8 shows a schematic block diagram of a method 500 for switching between access network devices according to an embodiment of the present disclosure. As shown in FIG. 8, the method 500 may include a portion or all of the following content.

In S510, after a target access network device is successfully accessed to by a terminal device while maintaining a connection with a source access network device, auxiliary information is received by a network device, wherein the network device is the source access network device or the target access network device.

In S520, response information of the auxiliary information is sent by the network device, and the response information is used for instruct the terminal device to release the connection with the source access network device.

In S510 and S520, optionally, the source access network device may directly receive the auxiliary information sent by the terminal device, and the source access network device sends response information of the auxiliary information, so as to instruct the terminal device to release the connection with the source access network device. Optionally, the target access network device may directly receive the auxiliary information sent by the terminal device, and the target access network device sends the response information of the auxiliary information, so as to instruct the terminal device to release the connection with the source access network device. Optionally, the source access network device may receive the auxiliary information sent by the terminal device, and the source access network device instructs the target access network device to send the response information of the auxiliary information to the terminal device, so as to instruct the terminal device to release the connection with the source access network device. Optionally, the target access network device may receive the auxiliary information sent by the terminal device, and the target access network device instructs the source access network device to send the response information of the auxiliary information to the terminal device, so as to instruct the terminal device to release the connection with the source access network device.

In an embodiment, the receiving, by the network device, the auxiliary information includes receiving, by the network device, the auxiliary information, in response that the terminal device determines that the channel quality of the source access network device meets a preset condition, wherein the auxiliary information is used for indicating that channel quality of the source access network device meets the preset condition.

In another embodiment, the auxiliary information is used to indicate the channel quality of the source access network device, and the network device may send the response information of the auxiliary information to the terminal device in response that the channel quality of the source access network device is determined to meet the preset condition.

Optionally, in embodiments of the present disclosure, the auxiliary information is used for indicating that a measured value of the channel quality of the source access network device is lower than a pre-configured threshold.

Optionally, in embodiments of the present disclosure, the pre-configured threshold includes a threshold corresponding to at least one of the following parameters: reference signal received power (RSRP), reference signal received quality (RSRQ), and signal to interference plus noise ratio (SINR).

Optionally, in embodiments of the present disclosure, the network device is the target access network device, and the auxiliary information is used for indicating that a radio link failure (RLF) occurs on a link between the terminal device and the source access network device.

Optionally, in embodiments of the present disclosure, the radio link failure (RLF) occurring on the link between the terminal device and the source access network device includes at least one of the following situations: retransmissions of a radio link control (RLC) automatic repeat-request (ARQ) reaching a maximum number of times, multiple out-of-synchronization indications being continuously received by the terminal device, and expiry of T310 or T312.

Optionally, in embodiments of the present disclosure, the network device is the source access network device, and the method further includes in response to receiving the auxiliary information, stopping, by the source access network device, scheduling of downlink data and/or sending, by the source access network device, data forwarding information to the target access network device.

Optionally, in embodiments of the present disclosure, the network device is the target access network device, and the method further includes sending, by the target access network device, indication information to the source access network device in response to receiving the auxiliary information, wherein the indication information is used for indicating that scheduling of downlink data is stopped by the source access network device and/or data forwarding information is sent to the target access network device by the source access network device.

Optionally, in embodiments of the present disclosure, the network device is the target access network device, and the method further includes receiving, by the target access network device, a packet data convergence protocol (PDCP) status report sent by the terminal device, in response that the connection with the source access network device is released by the terminal device.

Optionally, in embodiments of the present disclosure, the network device is the source access network device, and the method further includes before the random access to the target access network device is initiated by the terminal device, sending, by the source access network device, a handover command to the terminal device, wherein the handover command is used for instructing the terminal device to switch from the source access network device to the target access network device while maintaining the connection with the source access network device.

Optionally, in embodiments of the present disclosure, the handover command includes a measurement event of channel quality monitoring of the source access network device.

Optionally, in embodiments of the present disclosure, the auxiliary information is carried in a radio resource control (RRC) signaling, a medium access control (MAC) control element (CE) signaling, or uplink control information (UCI).

It should be understood that the interaction between the source access network device or the target access network device and the terminal device described on the network device side, and related characteristics and functions thereof, correspond to the related characteristics and functions of the terminal device. In addition, the related content has been described in detail in the above method 400, and is not repeated here for brevity.

It should be understood that in various embodiments of the present disclosure, the sequence number of the above-mentioned processes does not mean the performing order, and the performing order of the processes should be determined according to the functions and the internal logic thereof, and should not be limited in the implementations of embodiments of the present disclosure.

The foregoing describes in detail the method for switching between access network devices according to embodiments of the present disclosure. The following will describe a device for switching between access network devices according to embodiments of the present disclosure with reference to FIGS. 9 to 11. The technical features described in the method embodiments are applicable to the following device embodiments.

Figure 9:
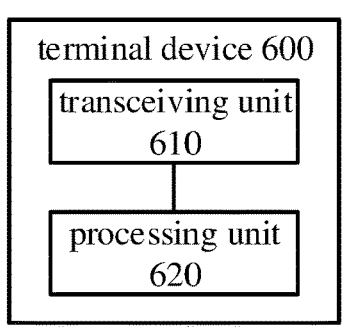
FIG. 9 is a schematic block diagram of a terminal device provided by an embodiment of the present disclosure.

FIG. 9 shows a schematic block diagram of a terminal device 600 according to an embodiment of the present disclosure. As shown in FIG. 9, the terminal device 600 includes a transceiving unit 610, configured to initiate a random access to a target access network device while maintaining a connection with a source access network device; and a processing unit 620, configured to release the connection with the source access network device after successfully accessing to the target access network device and in response to channel quality of the source access network device meeting a preset condition.

Optionally, in embodiments of the present disclosure, the processing unit is further configured to determine that the channel quality of the source access network device meets the preset condition, after successfully accessing to the target access network device. The transceiving unit is further configured to send auxiliary information to the source access network device and/or the target access network device, wherein the auxiliary information is used for indicating that the channel quality of the source access network device meets the preset condition; and receive response information of the auxiliary information, wherein the response information is used for instructing the terminal device to release the connection with the source access network device. The processing unit is specifically configured to release the connection with the source access network device according to the response information.

Optionally, in embodiments of the present disclosure, the processing unit is specifically configured to determine that a measured value of the channel quality of the access network device is lower than a pre-configured threshold.

Optionally, in embodiments of the present disclosure, the pre-configured threshold includes a threshold corresponding to at least one of the following parameters: reference signal received power (RSRP), reference signal received quality (RSRQ), and signal to interference plus noise ratio (SINR).

Optionally, in embodiments of the present disclosure, the processing unit is specifically configured to determine that a radio link failure (RLF) occurs on a link between the terminal device and the source access network device.

Optionally, in embodiments of the present disclosure, the RLF occurring on the link between the terminal device and the source access network device includes at least one of the following situations: retransmissions of a radio link control (RLC) automatic repeat-request (ARQ) reaching a maximum number of times, multiple out-of-synchronization indications being continuously received by the terminal device, and expiry of timer T310 or timer T312.

Optionally, in embodiments of the present disclosure, the transceiving unit is further configured to send a packet data convergence protocol (PDCP) status report to the target access network device, in response that the connection with the source access network device is released by the processing unit.

Optionally, in embodiments of the present disclosure, the transceiving unit is further configured to receive a handover command, before initiating the random access to the target access network device, wherein the handover command is used for instructing the terminal device to switch from the source access network device to the target access network device while maintaining the connection with the source access network device.

Optionally, in embodiments of the present disclosure, the handover command includes a measurement event of channel quality monitoring of the source access network device.

Optionally, in embodiments of the present disclosure, the auxiliary information is carried in a radio resource control (RRC) signaling, a medium access control (MAC) control element (CE) signaling, or uplink control information (UCI).

Therefore, in the terminal device according to embodiments of the present disclosure, the connection with the source access network device is released based on the channel quality of the source cell after the target access network device is successfully accessed to, so that the terminal device and the source access network device are kept in synchronization when the connection is released.

Further, the source cell may send the data forwarding to the target access network device in advance based on the auxiliary information, thereby reducing the interruption time of data transmission and reception and increasing the robustness of handover.

It should be understood that the terminal device 600 according to embodiments of the present disclosure may correspond to the terminal device in the method embodiments of the present disclosure, and the above-mentioned and other operations and/or functions of the units in the terminal device 600 are used to implement the corresponding processes for the terminal device in method as shown in FIG. 4, which will not be repeated here for the sake of brevity.

Figure 10:
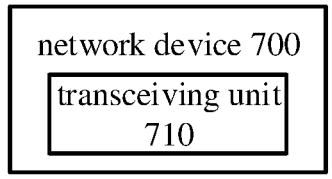
FIG. 10 is a schematic block diagram of a network device provided by an embodiment of the present disclosure.

FIG. 10 shows a schematic block diagram of a network device 700 according to an embodiment of the present disclosure. As shown in FIG. 10, the network device 700 includes a transceiving unit 710, configured to receive auxiliary information after a target access network device is successfully accessed to by a terminal device while maintaining a connection with a source access network device, wherein the network device is the source access network device or the target access network device, the transceiving unit 710 is further configured to send response information of the auxiliary information, wherein the response information is used for instructing the terminal device to release the connection with the source access network device.

Optionally, in embodiments of the present disclosure, the transceiving unit is specifically configured to receive the auxiliary information in response that the terminal device determines that channel quality of the source access network device meets a preset condition, wherein the auxiliary information is used for indicating that channel quality of the source access network device meets a preset condition.

Optionally, in embodiments of the present disclosure, the auxiliary information is used for indicating that a measured value of the channel quality of the source access network device is lower than a pre-configured threshold.

Optionally, in embodiments of the present disclosure, the pre-configured threshold includes a threshold corresponding to at least one of the following parameters: reference signal received power (RSRP), reference signal received quality (RSRQ), and signal to interference plus noise ratio (SINR).

Optionally, in embodiments of the present disclosure, the network device is the target access network device, and the auxiliary information is used for indicating that a radio link failure (RLF) occurs on a link between the terminal device and the source access network device.

Optionally, in embodiments of the present disclosure, the radio link failure (RLF) occurring on the link between the terminal device and the source access network device includes at least one of the following situations: retransmissions of a radio link control (RLC) automatic repeat-request (ARQ) reaching a maximum number of times, multiple out-of-synchronization indications being continuously received by the terminal device, and expiry of T310 or T312.

Optionally, in embodiments of the present disclosure, the network device is the source access network device, and the network device further includes a processing unit, configured to stop scheduling of downlink data in response that the auxiliary information is received by the transceiving unit, and/or the transceiving unit is further configured to send data forwarding information to the target access network device in response to receiving the auxiliary information.

Optionally, in embodiments of the present disclosure, the network device is the target access network device, and the transceiving unit is further configured to send indication information to the source access network device in response to receiving the auxiliary information, wherein the indication information is used for indicating that scheduling of downlink data is stopped by the source access network device and/or data forwarding information is sent to the target access network device by the source access network device.

Optionally, in embodiments of the present disclosure, the network device is the target access network device, and the transceiving unit is further configured to receive a packet data convergence protocol (PDCP) status report sent by the terminal device in response that the connection with the source access network device is released by the terminal device.

Optionally, in embodiments of the present disclosure, the network device is the source access network device, and the transceiving unit is further configured to send a handover command to the terminal device before the random access to the target access network device is initiated by the terminal device, wherein the handover command is used for instructing the terminal device to switch from the source access network device to the target access network device while maintaining the connection with the source access network device.

Optionally, in embodiments of the present disclosure, the handover command includes a measurement event of channel quality monitoring of the source access network device.

Optionally, in embodiments of the present disclosure, the auxiliary information is carried in a radio resource control (RRC) signaling, a medium access control (MAC) control element (CE) signaling, or uplink control information (UCI).

It should be understood that the network device 700 according to embodiments of the present disclosure may correspond to the source access network device or the target access network device in the method embodiments of the present disclosure, and the above-mentioned and other operations and/or functions of the units in the network device 700 are intended to implement the corresponding processes for the network device in the method shown in FIG. 8, which will not be repeated here for the sake of brevity.

Figure 11:
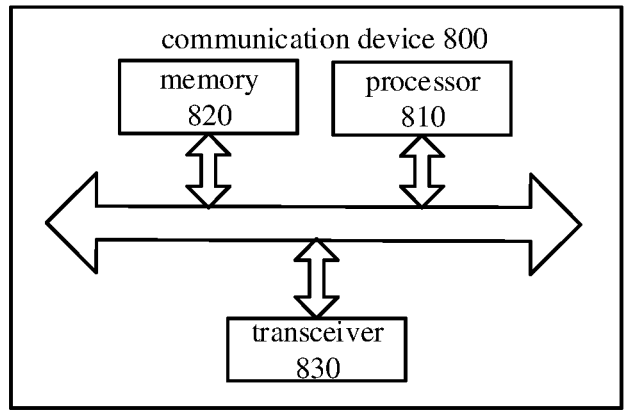
FIG. 11 is a schematic block diagram of a communication device provided by an embodiment of the present disclosure.

FIG. 11 is a schematic structural diagram of a communication device 800 according to an embodiment of the present disclosure. The communication device 800 shown in FIG. 11 includes a processor 810, and the processor 810 may call and run a computer program from a memory to perform the method in embodiments of the present disclosure.

According to embodiments, as shown in FIG. 11, the communication device 800 may further include a memory 820. The processor 810 may call and run a computer program from the memory 820 to perform the method in embodiments of the present disclosure.

The memory 820 may be a separate device independent of the processor 810, or may be integrated in the processor 810.

According to embodiments, as shown in FIG. 11, the communication device 800 may further include a transceiver 830, and the processor 810 may control the transceiver 830 to communicate with other devices. Specifically, the transceiver may send information or data to other devices, or receive information or data sent by other devices.

The transceiver 830 may include a transmitter and a receiver. The transceiver 830 may further include one or more antennas.

According to embodiments, the communication device 800 may specifically be the network device (a source access network device or a target access network device) according to an embodiment of the present disclosure, and the communication device 800 may implement the corresponding processes implemented by the network device in the method embodiments of the present disclosure. For brevity, details are not repeated here.

According to embodiments, the communication device 800 may specifically be the mobile terminal/terminal device in embodiments of the present disclosure, and the communication device 800 may implement the corresponding processes implemented by the mobile terminal/terminal device in the method embodiments of the present disclosure. For brevity, details are not repeated here.

Figure 12:
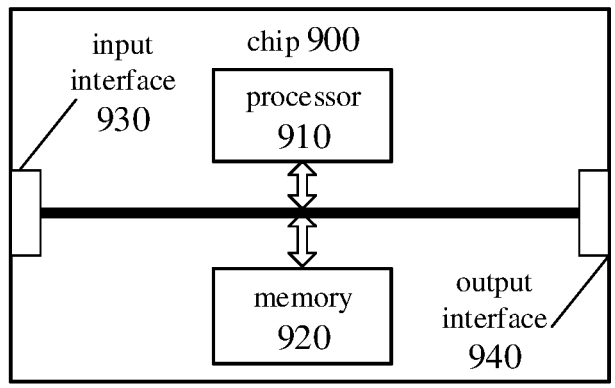
FIG. 12 is a schematic block diagram of a chip provided by an embodiment of the present disclosure.

FIG. 12 is a schematic structural diagram of a chip according to an embodiment of the present disclosure. The chip 900 shown in FIG. 12 includes a processor 910, and the processor 910 can call and run a computer program from a memory to implement the method according to embodiments of the present disclosure.

According to embodiments, as shown in FIG. 12, the chip 900 may further include a memory 920. The processor 910 may call and run a computer program from the memory 920 to implement the method according to embodiments of the present disclosure.

The memory 920 may be a separate device independent of the processor 910, or may be integrated in the processor 910.

According to embodiments, the chip 900 may further include an input interface 930. The processor 910 may control the input interface 930 to communicate with other devices or chips. Specifically, the processor 910 can control the input interface to obtain information or data sent by other devices or chips.

According to embodiments, the chip 900 may further include an output interface 940. The processor 910 can control the output interface 940 to communicate with other devices or chips. Specifically, the processor 910 can control the output interface 940 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in embodiments of the present disclosure may also be referred to as a system-level chip, a system chip, a chip system, or a system-on-chip, etc.

Figure 13:
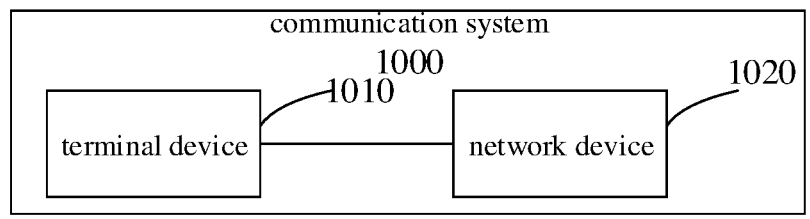
FIG. 13 is a schematic diagram of a communication system provided by an embodiment of the present disclosure.

FIG. 13 is a schematic block diagram of a communication system 1000 according to an embodiment of the present disclosure. As shown in FIG. 13, the communication system 1000 includes a terminal device 1010 and a network device 1020.

The terminal device 1010 may be configured to implement the corresponding functions implemented by the terminal device in the foregoing methods, and the network device 1020 may be configured to implement the corresponding functions implemented by the network device in the foregoing methods. For brevity, details are not repeated herein again.

It should be understood that the processor in embodiments of the present disclosure may be an integrated circuit chip with signal processing capability. In implementations, steps in the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in embodiments of the present disclosure can be implemented or executed. The general-purpose processor may be a microprocessor, or the processor may also be any conventional processor or the like. Steps of the methods disclosed in embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, electrically erasable programmable memory, or register. The storage medium is located in the memory, and the processor reads the information in the memory to perform steps of the above methods in combination with hardware.

It can be understood that the memory in embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the terminal device in embodiments of the present disclosure, and when the computer program runs on a computer, the computer is caused to perform the corresponding processes implemented by the terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In several embodiments provided by the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units. That is, the units may be located in one place, or may be distributed over multiple network units. Some or all of the units may be selected according to actual needs to achieve the objectives of the solutions in embodiments of the present disclosure.

In addition, the functional units in embodiments of the present disclosure may be integrated in one processing unit, or the units may exist alone physically, or two or more units may be integrated in one unit.

The functions may also be stored in a computer-readable storage medium, if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in storage medium including a number of instructions, such that a computer device (which may be a personal computer, a server, or a network device, etc.) performs all or part of steps of the method described in each embodiments of the present disclosure. The foregoing storage medium includes any medium that is capable of storing program codes, such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for switching between access network devices, comprising:
    initiating, by a terminal device, a random access to a target access network device while maintaining a connection with a source access network device;
    determining, by the terminal device, that the channel quality of the source access network device meets the preset condition, after successfully accessing to the target access network device;
    sending, by the terminal device, auxiliary information to the target access network device, wherein the auxiliary information is configured to indicate that the channel quality of the source access network device meets the preset condition;
    receiving, by the terminal device, response information of the auxiliary information, wherein the response information is configured to instruct the terminal device to release the connection with the source access network device; and
    releasing, by the terminal device, the connection with the source access network device according to the response information, wherein
    indication information is sent by the target access network device to the source access network device in response to receiving the auxiliary information, and
    the indication information is configured to indicate at least one of that: scheduling of downlink data is stopped by the source access network device; or data forwarding information is sent to the target access network device by the source access network device.

2. The method according to claim 1, wherein the determining, by the terminal device, that the channel quality of the source access network device meets the preset condition, comprises:
   determining, by the terminal device, that a measured value of the channel quality of the source access network device is lower than a pre-configured threshold.

3. The method according to claim 1, wherein the determining, by the terminal device, that the channel quality of the source access network device meets the preset condition, comprises:
   determining, by the terminal device, that a radio link failure (RLF) occurs on a link between the terminal device and the source access network device.

4. The method according to claim 3, wherein the RLF occurring on the link between the terminal device and the source access network device comprises at least one of the following situations: retransmissions of a radio link control (RLC) automatic repeat-request (ARQ) reaching a maximum number of times, multiple out-of-synchronization indications being continuously received by the terminal device, and expiry of timer T310 or timer T312.

5. The method according to claim 1, further comprising:
   before initiating the random access to the target access network device, receiving, by the terminal device, a handover command, wherein the handover command is configured to instruct the terminal device to switch from the source access network device to the target access network device while maintaining the connection with the source access network device.

6. A terminal device comprising: a processor; and a memory, wherein the memory is configured to store a computer program, and the processor is configured to call and run the computer program stored in the memory to execute operations of:
   initiating, by the terminal device, a random access to a target access network device while maintaining a connection with a source access network device,
   determining, by the terminal device, that the channel quality of the source access network device meets the preset condition, after successfully accessing to the target access network device;
   sending, by the terminal device, auxiliary information to the target access network device, wherein the auxiliary information is configured to indicate that the channel quality of the source access network device meets the preset condition;
   receiving, by the terminal device, response information of the auxiliary information, wherein the response information is configured to instruct the terminal device to release the connection with the source access network device; and
   releasing, by the terminal device, the connection with the source access network device according to the response information, wherein
   indication information is sent by the target access network device to the source access network device in response to receiving the auxiliary information, and
   the indication information is configured to indicate at least one of that: scheduling of downlink data is stopped by the source access network device; or data forwarding information is sent to the target access network device by the source access network device.

7. The terminal device according to claim 6, wherein the determining, by the terminal device, that the channel quality of the source access network device meets the preset condition, comprises:
   determining, by the terminal device, that a measured value of the channel quality of the source access network device is lower than a pre-configured threshold.

8. The terminal device according to claim 6, wherein the determining, by the terminal device, that the channel quality of the source access network device meets the preset condition, comprises:
   determining, by the terminal device, that a radio link failure (RLF) occurs on a link between the terminal device and the source access network device.

9. The terminal device according to claim 8, wherein the RLF occurring on the link between the terminal device and the source access network device comprises at least one of the following situations: retransmissions of a radio link control (RLC) automatic repeat-request (ARQ) reaching a maximum number of times, multiple out-of-synchronization indications being continuously received by the terminal device, and expiry of timer T310 or timer T312.

10. The terminal device according to claim 6, wherein the processor is further configured to call and run the computer program stored in the memory to execute an operation of:
    before initiating the random access to the target access network device, receiving, by the terminal device, a handover command, wherein the handover command is configured to instruct the terminal device to switch from the source access network device to the target access network device while maintaining the connection with the source access network device.

11. A network device comprising: a processor; and a memory, wherein the memory is configured to store a computer program, and the processor is configured to call and run the computer program stored in the memory to execute operations of:
    after a target access network device is successfully accessed by a terminal device while maintaining a connection with a source access network device, receiving, by the network device, auxiliary information; and
    sending, by the network device, response information of the auxiliary information, wherein the response information is configured to instruct the terminal device to release the connection with the source access network device,
    wherein the network device is the target access network device, and the processor is further configured to call and run the computer program stored in the memory to execute an operation of:
    sending, by the target access network device, indication information to the source access network device in response to receiving the auxiliary information, wherein the indication information is configured to indicate at least one of that: scheduling of downlink data is stopped by the source access network device; or data forwarding information is sent to the target access network device by the source access network device.

12. The network device according to claim 11, wherein the receiving, by the network device, the auxiliary information, comprises:
    receiving, by the network device, the auxiliary information, wherein the auxiliary information is configured to indicate that channel quality of the source access network device meets a preset condition.

13. The network device according to claim 12, wherein the auxiliary information is configured to indicate that a measured value of the channel quality of the source access network device is lower than a pre-configured threshold.

14. The network device according to claim 12, wherein the auxiliary information is configured to indicate that a radio link failure (RLF) occurs on a link between the terminal device and the source access network device.

15. The network device according to claim 14, wherein the radio link failure (RLF) occurring on the link between the terminal device and the source access network device comprises at least one of the following situations: retransmissions of a radio link control (RLC) automatic repeat-request (ARQ) reaching a maximum number of times, multiple out-of-synchronization indications being continuously received by the terminal device, and expiry of T310 or T312.

* * * * *